United States Patent [19]
Edenhofer et al.

[11] 3,723,445
[45] Mar. 27, 1973

[54] PROCESS FOR THE PREPARATION OF [3-(4-PHENYL)-1-(2H)-3,6-DIHYDRO-PYRIDYL]-PROPOXY OR PROPYLTHIO-ANILIDES OR DERIVATIVES THEREOF

[75] Inventors: Albrecht Edenhofer, Riehen; Hans Spiegelberg, Basel, both of Switzerland

[73] Assignee: Hoffmann-La Roche Inc., Nutley, N.J.

[22] Filed: June 14, 1971

[21] Appl. No.: 152,979

[30] Foreign Application Priority Data

June 17, 1970 Switzerland...........................9145/70

[52] U.S. Cl...260/295 AM, 260/244 R, 260/294.8 F, 260/294.8 G, 260/296 R, 260/297 R, 424/266

[51] Int. Cl...............................................C07d 31/44

[58] Field of Search .260/294.8 G, 294.8 F, 295 AM, 260/296 R, 297 R

[56] References Cited

UNITED STATES PATENTS 3,674,799    7/1972    Edenhofer et al.................260/294.8

Primary Examiner—Alan L. Rotman
Attorney—Samuel L. Welt et al.

[57] ABSTRACT

A process of preparing aromatic ethers comprising subjecting an appropriately substituted oxazine to acidic rearrangement is described. The end products are useful as antiphlogistic, antiallergic, antitussive and analgesic agents.

9 Claims, No Drawings

PROCESS FOR THE PREPARATION OF [3-(4-PHENYL)-1-(2H)-3,6-DIHYDRO-PYRIDYL]-PROPOXY OR PROPYLTHIO-ANILIDES OR DERIVATIVES THEREOF

DESCRIPTION OF THE INVENTION

The present invention relates to a process of preparing pharmacologically valuable aromatic ethers. More particularly, the present invention is concerned with the preparation of substituted [3-(4-phenyl-1-hydropyridyl)-propoxy or propylthio] anilines. The products obtainable following the instant process are useful as antiphlogistic, antiallergic, antitussive and analgesic agents.

Following the process of the present invention, one can prepare aromatic ethers of the formula

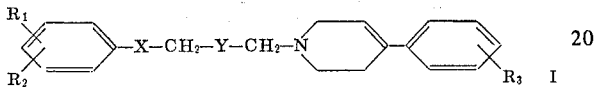

wherein $R_1$ signifies hydrogen, amino, mono-lower alkylamino, lower alkanoylamido, N-(lower alkyl)-N-(lower alkanoyl)-amido, or lower alkylsulfonylamido; $R_2$ signifies hydrogen, halogen, lower alkyl or lower alkoxy; $R_3$ signifies halogen; X signifies an oxygen or sulfur atom; and Y signifies methylene, hydroxymethylene, lower alkanoyloxymethylene or carbonyl
and the pharmaceutically acceptable acid addition salts thereof.

As used herein, the term "lower alkyl" denotes straight or branched chain lower alkyl of one to six carbon atoms, for example, methyl, ethyl, isopropyl, butyl, pentyl and the like. The term "lower alkoxy" denotes lower alkyl ether groups in which the lower alkyl is as described above, for example, methoxy, ethoxy, isopropoxy and the like. The term "halogen" denotes chlorine, bromine, fluorine and iodine. Of the halogen atoms, fluorine and chlorine are preferred.

The amino group can be substituted by lower alkyl of one to six carbon atoms such as, for example, methyl-, ethyl-, propyl-, butyl- or pentyl-amino and the like. The term "lower alkanoyl", used either alone or in combination as in lower alkanoylamido, denotes a residue of a carboxylic acid of one to six carbon atoms, for example, formyl, acetyl, propionyl or the like; acetyl is preferred. The lower alkylsulfonyl residues, as in lower alkylsulfonylamido, are derived from sulfuric acid substituted by lower alkyl, for example, methylsulfonyl, ethylsulfonyl and the like; methylsulfonyl is preferred.

Examples of compounds of formula I above which can be prepared following the process of the present invention include:

rac. 4'-{3- 4-(p-chlorophenyl)-3,6-dihydro-1(2H)-pyridyl -2-hydroxy-propoxy}-acetanilide, rac. 4'{3-[4-(p-fluorophenyl)-3,6-dihydro-1(2H)-pyridyl]-2-hydroxy-propoxy}-propionanilide, rac. 4'{3-[4-(p-fluorophenyl)-3,6-dihydro-1(2H)-pyridyl]-2-hydroxy-propoxy}-isobutyranilide, (+)-4'-{3-[4-(p-fluorophenyl)-3,6-dihydro-1(2H)-pyridyl]-2-hydroxy-propoxy}-isobutyranilide hydrochloride, (−)-4'-{3-[4-(p-fluorophenyl)-3,6-dihydro-1(2H)-pyridyl]-2-hydroxy-propoxy}-isobutyranilide, rac. 4'-{3-[4-(p-fluorophenyl)-3,6-dihydro-1(2H)-pyridyl]-2-acetoxy-propoxy}-propionanilide, 4'-{3-[4-(p-fluorophenyl)-3,6-dihydro-1(2H)-pyridyl]propoxy}-acetanilide, 4'-{3-[4-(p-fluorophenyl)-3,6-dihydro-1(2H)-pyridyl]propoxy}-methanesulfonanilide, rac. 4'-{[3-[4-(p-fluorophenyl)-3,6-dihydro-1(2H)-pyridyl]-2-hydroxy-propyl]-thio}-acetanilide and rac. 4'-{[3-[4-(p-fluorophenyl)-3,6-dihydro-1(2H)-pyridyl]-2hydroxy-propyl]-thio}-chlorobenzene.

In following the novel process of the present invention, the useful compounds of formula I above are prepared by the acidic rearrangement of a compound of the formula

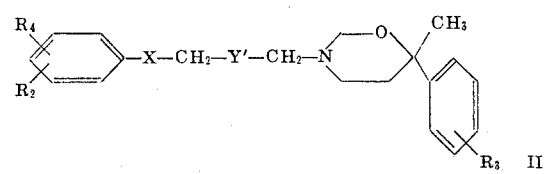

wherein $R_2$, $R_3$ and X are as described above; Y' signifies methylene, hydroxymethylene or carbonyl and $R_4$ signifies hydrogen, nitro, lower alkanoylamido or N-(lower alkyl)-N-(lower alkanoyl)-amido.

The acid rearrangement of a compound of formula II above results in a compound of the formula

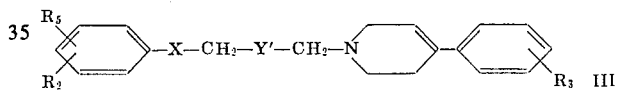

wherein $R_2$, $R_3$, X and Y' are as described above and $R_5$ signifies hydrogen, nitro, amino, or mono-lower alkylamino.

The acid rearrangement of the compounds of formula II is carried out using strong mineral acids such as hydrochloric acid, sulfuric acid and the like, with concentrated hydrochloric acid being the preferred reagent. The acid rearrangement is conducted at a temperature in the range of from about 0°C. to the reflux temperature of the reaction mixture, preferably at elevated temperatures. A reaction time sufficient to permit completion of the acid rearrangement is employed, preferably the reaction is conducted over a prolonged period, i.e., from about three to six hours.

After the rearrangement has been completed, the reaction mixture is cooled, poured into water, made alkaline and extracted, preferably with a chlorinated hydrocarbon, especially with chloroform. The chloroform extract is concentrated. The compound of formula I which, in most cases separates out in crystalline form, can, if necessary, be purified by recrystallization from an alkanol (e.g., methanol).

The compounds of formula III above wherein $R_5$ signifies a nitro group can be converted to the corresponding compound wherein $R_5$ signifies amino following conventional reduction techniques. For example, the reduction can be carried out using chemical or catalytic means such as with tin and hydrochloric acid or with hydrazine in the presence of a Noble metal catalyst. The reduction with hydrazine is expediently carried out at room temperature in an alkanol, preferably ethanol, in the presence of palladium/charcoal or platinum oxide as a catalyst.

It should be noted that any lower alkanoylamido groups present in the starting materials of formula II will be saponified under the acidic rearrangement conditions. Thus, for example, if the $R_4$ substituent in the starting material of formula II is a lower alkanoylamido group, this group will be saponified to an amino group and in the end product of formula III the $R_5$ substituent will be an amino group. Likewise, if the $R_4$ substituent in the formula II starting material is an N-(lower alkyl)-N-(lower alkanoyl)-amido group, acid rearrangement of said compound will result in the corresponding compound of formula III wherein $R_5$ signifies a mono-lower alkylamino group.

The compounds of formula III above wherein $R_5$ signifies an amino group or a mono-lower alkylamino group can be N-acylated following conventional techniques to obtain the corresponding compound of formula I wherein $R_1$ signifies lower alkanoylamido, N-(lower alkyl)-N-(lower alkanoyl)-amido or lower alkylsulfonylamido. For example, the N-acylation can be accomplished by treatment of the amino-substituted compound with an appropriate acid halide or acid anhydride. When the N-acylation is carried out using an alkanoyl or alkylsulfonyl halide, the reaction is expediently effected in the presence of a base, for example, pyridine or triethylamine, at a temperature below room temperature, preferably at about 0°C. to about 5°C. When the N-acylation is carried out using an alkanoic acid anhydride, it is preferably carried out in the presence of a protonic solvent such as dilute acetic acid, at room temperature.

Compounds of formula I obtained as described above in which Y represents a carbonyl group can be reduced to the corresponding compounds of formula I in which Y represents a hydroxymethylene group following conventional techniques. For example, this reduction can be accomplished by treatment with a complex metal hydride, especially with a complex borohydride. The reduction is expediently carried out using an alkali metal borohydride, especially sodium borohydride, in a lower alkanol such as ethanol at a temperature between room temperature and the boiling point of the mixture.

Compounds of formula I in which Y represents a hydroxymethylene group can be acylated following standard procedures, for example, by treatment with an alkanoyl halide, expediently in the presence of a base (for example, pyridine or triethylamine), or a suitable anhydride (e.g., acetic anhydride). This acylation is preferably carried out at a temperature between room temperature and the boiling point of the solvent. The acylation can also be carried out in an aprotonic polar solvent such as, for example, dimethylsulfoxide. An amino group or mono-lower alkylamino group which is present as the $R_1$ substituent is likewise acylated under these conditions.

The compounds of formula I in which Y represents a hydroxymethylene or lower alkanoyloxymethylene group are obtained as racemic mixtures. These racemic mixtures can be resolved into the optical antipodes in a known manner, for example, with the aid of optically active acids such as tartaric acid. The resolution into the optical antipodes can also be carried out during the process on an intermediate compound of formula III in which $R_5$ represents a nitro group.

The starting materials of formula II hereinbefore are novel and as such also form a part of this invention. These compounds can be prepared, for example, by reacting a compound of the general formula

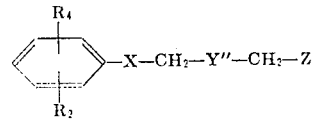

wherein $R_2$, $R_4$ and X are as described above; Y'' represents a methylene or hydroxymethylene group; Z represents a suitable leaving group selected from the group consisting of halogen, lower alkylsulfonyloxy such as mesyloxy or arylsulfonyloxy such as tosyloxy; or Y'' taken together with Z and the terminal methylene group form the

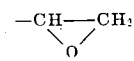

group with a compound of the general formula

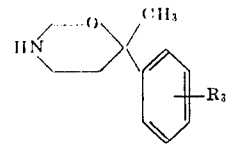

wherein $R_3$ is as described above.

The compounds of formulas IV and V above are known compounds or can be prepared in analogy to the preparation of known compounds.

The reaction of a compound of formula IV with a compound of formula V to give the desired starting material of formula II is, for example, carried out by linking an epoxide, halide, alkylsulfonyloxy or arylsulfonyloxy compound of formula IV with a 6-methyl-6-phenyl-1,3-oxazine of formula V by amination. An epoxide of formula IV can, for example, be reacted with a compound of formula V in a polar organic solvent (e.g., a lower alkanol such as methanol or a cyclic ether such as dioxane) at a temperature between room temperature and the boiling point of the reaction mixture. A halide, mesyloxy or tosyloxy compound of formula IV can be reacted with a compound of formula V in the presence of potassium or sodium carbonate in a lower alkanol such as ethanol or isopropanol or in dimethylformamide or tetrahydrofuran at a temperature between room temperature and the boiling point of the reaction mixture.

In an alternate procedure, the starting materials of formula II can be prepared by reacting a compound of the general formula

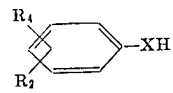

wherein $R_2$, $R_4$ and X are as described above with a compound of the general formula

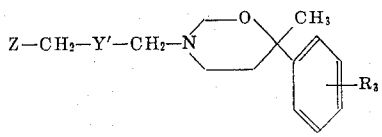

VII wherein $R_3$, Y' and Z are as described above or Z together with Y' and the terminal methylene group forms the

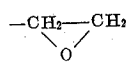

group.

The compounds of formula VI, for example, p-hydroxyacetanilide, are known compounds or can be prepared in analogy to the preparation of known compounds. The compounds of formula VII are novel; these compounds can be prepared, for example, by reacting a correspondingly substituted 6-methyl-6-phenyl-1,3-oxazine with an epihalohydrin in a polar solvent (e.g., a lower alkanol such as methanol or an ether such as diethylether) at a temperature between 0°C. and room temperature. If an acid-binding agent (e.g., an aqueous or alkanolic caustic alkali, especially aqueous caustic potash or ethanolic caustic potash) is allowed to act on a halohydrin compound obtained, preferably at room temperature, there is obtained a corresponding epoxide of formula VII. The corresponding tosyloxy compounds of formula VII can, for example, be obtained by reacting an aforementioned epoxide with p-toluenesulphonic acid. The other compounds of formula VII can be obtained in an analogous manner.

The reaction of a compound of formula VI with a compound of formula VII to give a compound of formula II is, for example, carried out by etherifying a phenolate of formula VI with a halide or alkylsulphonyloxy or aralkylsulphonyloxy compound of formula VII or by reacting an epoxide of formula VII with a phenol of formula VI. An advantageous procedure comprises allowing the two reaction components to react with each other in the presence of an alkali phenolate, expediently at the reflux temperature of the reaction mixture. If an epoxide of formula VII is used, the reaction with a compound of formula VI is preferably carried out in the presence of a catalytic amount of an organic or inorganic base (e.g., pyridine or potassium hydroxide) in a polar solvent (especially in a lower alkanol such as ethanol or in a cyclic ether such as dioxane), expediently at the reflux temperature of the reaction mixture.

The preferred starting materials of formula II are those in which $R_2$ represents a hydrogen atom, Y' represents a hydroxymethylene group and $R_4$ represents a lower alkanoylamido group. Especially preferred starting materials of formula II are those in which $R_3$ and $R_4$ are both present in the paraposition of their respective phenyl rings and X represents an oxygen atom.

Compounds of formula I in which $R_1$ represents a lower alkanoylamido group, $R_2$ represents a hydrogen atom, $R_3$ represents a fluorine or chlorine atom, X represents an oxygen or sulphur atom and Y represents a methylene or hydroxymethylene group are preferred.

The compounds of formula I above obtained by following the present invention are pharmacologically active, primarily distinguished by antipholgistic, antiallergic, antitussive and analgesic properties.

The compounds of formula I form acid addition salts with inorganic and organic acids. Examples of such salts are those formed with hydrohalic acids (especially with hydrochloric or hydrobromic acid) with other mineral acids such as sulphuric acid and with organic acids such as benzoic acid, acetic acid, tartaric acid, citric acid and lactic acid.

The aromatic ethers of formula I above can be used, for example, in the form of pharmaceutical preparations which contain them in admixture with a compatible pharmaceutical carrier. This can be an organic or inorganic inert carrier suitable for enteral or parenteral application such as, for example, water, gelatin, gum arabic, lactose, starches, vegetable oils, polyalkylene glycols, petroleum jelly etc. The pharmaceutical preparations can be made up in solid form (e.g., as tablets, dragees, suppositories or capsules) or in liquid form (e.g., as solutions, suspensions or emulsions). The pharmaceutical preparations may be sterilized and/or may contain adjuvants such as preserving, stabilizing, wetting or emulsifying agents or salts for varying the osmotic pressure. They can also contain other therapeutically valuable substances.

The following Examples further illustrate the invention.

EXAMPLE 1

The starting material may be prepared as follows:
one g. of 6-methyl-6-(p-fluoro-phenyl)-tetrahydro-1,3-oxazine and 1.1 g. of 4'-(2,3-epoxy-propoxy)-acetanilide are introduced into 20 ml. of ethanol and heated under reflux conditions for 3 hours. The solvent is subsequently removed under reduced pressure. The residual oily crude rac. 4'-{3-[6-(p-fluoro-phenyl)-dihydro-6-methyl-2H-1,3-oxazin-3(4H)-yl]-2-hydroxy-propoxy}-acetanilide is purified by adsorption on silica gel [methylene chloride/ether (1:1)]. The hydrochloride prepared therefrom may, with ethyl acetate, be obtained in the form of an amorphous powder which melts at about 80°C.

After the addition of 2 ml. of concentrated hydrochloric acid, 0.2 g. of rac. 4'-{3-[6-(p-fluoro-phenyl)-dihydro-6-methyl-2H-1,3-oxazin-3(4H)-yl]-2-hydroxy-propoxy}-acetanilide hydrochloride are heated on a steam-bath for 4 hours. The cooled mixture is subsequently poured into 10 ml. of water, made alkaline with concentrated caustic soda and exhaustively extracted with chloroform. The crystalline rac. p-{3-[4-(p-fluoro-phenyl)-3,6-dihydro-1(2H)-pyridyl]-2-hydroxy-propoxy}-aniline obtained from the chloroform extract melts at 145°C. after recrystallization from methanol.

In an analogous manner, rac. p-{[3-[4-(p-fluoro-phenyl)-3,6-dihydro-1(2H)-pyridyl]-2-hydroxypropyl]-thio}-chloro-benzene hydrochloride of melting point 177°–179°C. (from ethanol) can be obtained from rac. p-{[3-[6-(p-fluoro-phenyl)-dihydro-6-methyl-2H-1,3-oxazin-3(4H)-yl]-2-hydroxy-propyl]-thio}-chlorobenzene hydrochloride of melting point 180°–181°C. (decomposition).

EXAMPLE 2

After the addition of 2 ml. of concentrated hydrochloric acid, 1 g. of 4-{3-[6-(p-fluoro-phenyl)-dihydro-6-methyl-2H-1,3-oxazin-3(4H)-yl]-propoxy}-acetanilide hydrochloride is heated on a steam-bath for 4 hours. The cooled mixture is poured into 50 ml. of water, made alkaline with concentrated caustic soda and exhaustively extracted with chloroform. The crystalline p-{3-[4-(p-fluoro-phenyl)-3,6-dihydro-1(2H)-pyridyl]-propoxy}-aniline melts at 103°–104°C. after recrystallization from methanol.

The starting material may be prepared as follows: 4.9 g. of 4'-(3-bromo-propoxy)-acetanilide and 3.5 g. of 6-methyl-6-(p-fluoro-phenyl)-tetrahydro-1,3-oxazine are heated under reflux conditions in the presence of 2.7 g. of potassium carbonate in 50 ml. of ethanol. The mixture is filtered while it is still hot. The filtrate is evaporated to dryness. The residue is partitioned between water and methylene chloride. The oil obtained from the organic phase is adsorbed on silica gel and eluted with methylene chloride/ether (1:1). The resulting 4'-{3-[6-(p-fluoro-phenyl)-dihydro-6-methyl-2H-1,3-oxazin-3(4H)-yl]-propoxy}-acetanilide is converted into the hydrochloride which melts at 200°–201 °C. (decomposition) after recrystallization from ethanol/ethyl acetate.

EXAMPLE 3

1 g. of rac. p-{3-[4-(p-fluoro-phenyl)-3,6-dihydro-1(2H)- pyridyl]-hydroxy-propoxy}-aniline are dissolved in 19 ml. of 10 percent isobutyric acid. The solution is treated with 1 g. of isobutyric acid anhydride and, after storing at room temperature for 12 hours, evaporated under reduced pressure. The residue is taken up in chloroform. The chloroform solution is washed with 1-N caustic soda and water, dried and evaporated. The residual rac. 4'{3-[4-(p-fluoro-phenyl)-3,6-dihydro-1(2H)- pyridyl]-2-hydroxy-propoxy}-isobutyranilide melts at 184°–185°C. after recrystallization from ethanol.

The racemate can be split into the optical isomers with the aid of (−) 0,0-dibenzoyltartaric acid. (−) 4'-{3-[4-(p-fluoro-phenyl)-3,6-dihydro-1(2H)-pyridyl]2-hydroxy-propoxy}-isobutyranilide melts at 187.5°–189 °C. after recrystallization from ethanol; $[\alpha]_{436}^{20} = -21.8°$ (in methanol, c=1).

The hydrochloride prepared therefrom in the usual way melts at 185°–188°C. after recrystallization from ethanol/ethyl acetate; $[\alpha]_{436}^{20} = +26.3°$ (in methanol, c = 1).

EXAMPLE 4

3 g. of p-{3-[4-(p-fluoro-phenyl)-3,6-dihydro-1(2H)-pyrldyl]- propoxy}-aniline are dissolved with slight warming in a mixture of 10 ml. of chloroform and 1 g. of triethylamine and, while stirring, the resulting mixture is treated dropwise at 0°–5°C. with a solution of 1.1 g. of methanesulfonyl chloride in 5 ml. of chloroform. The mixture is left to stand at room temperature for 16 hours and, after the addition of 20 ml. of chloroform, poured into water. The 4'-{3-[4-(p-fluoro-phenyl)-3,6-dihydro-1(2H)-pyridyl]-propoxy}-methanesulfonanilide obtained from the organic phase melts at 147°–149°C. after recrystallization from methanol.

In an analogous manner, rac. 4'-{3-[4-(p-fluoro-phenyl)-3,6-dihydro-1(2H)-pyridyl]-2-hydroxy-propoxy}-methanesulfonanilide of melting point 171°C. (from diluted methanol) can be obtained from rac. p-{3-[4-(p-fluoro-phenyl)-3,6-dihydro-1(2H)-pyridyl]-2-hydroxy-propoxy}-aniline.

EXAMPLE 5

Four g. of rac. 4'-{3-[4-(p-fluoro-phenyl)-3,6-dihydro-1(2H)-pyridyl]-2-hydroxy-propoxy}-propionanilide are dissolved in 20 ml. of dimethyl sulfoxide and treated with 10 ml. of acetic anhydride. After leaving the mixture to stand at room temperature for 16 hours, it is poured into water and extracted with chloroform. The oily crude product obtained from the organic phase is dissolved in ethyl acetate and converted into the hydrochloride by the addition of alcoholic hydrochloric acid. The resulting rac. 4'-{3-[4-(p-fluoro-phenyl)-3,6-dihydro-1(2H)-pyridyl]-2-acetoxy-propoxy}-propionanilide melts at 210°–212°C. after recrystallization from isopropanol.

EXAMPLE 6

Tablets each weighing 150 mg. and containing the following ingredients:

| | |
|---|---|
| (−) 4'-{ 3-[4-(p-fluoro-phenyl)-3,6-dihydro-1(2H)-pyridyl]-2-hydroxy-propoxy }-isobutyranilide | 10 mg. |
| Lactose | 63 mg. |
| Corn Starch | 74 mg. |
| Talc | 2.7 mg. |
| Magnesium stearate | 0.3 mg. | are prepared by mixing the isobutyranilide active ingredient with the lactose and corn starch and granulating the mixture with the aid of ethanol. The granulate is dried, mixed with the talc and magnesium stearate and pressed to form tablets.

We claim:
1. A process for the preparation of a compound of the formula

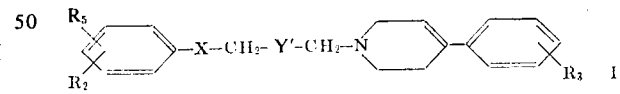

wherein $R_2$ signifies hydrogen, halogen, lower alkyl or lower alkoxy; $R_3$ signifies halogen; $R_5$ signifies hydrogen, nitro, amino or mono-lower alkylamino, X signifies oxygen or sulfur; Y' signifies methylene, hydroxymethylene or carbonyl which consisting essentially of treating a compound of the formula

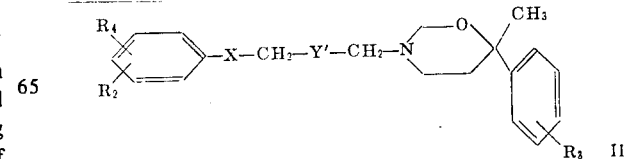

wherein $R_2$, $R_3$, X, and Y' are as described above and $R_4$ signifies hydrogen, nitro, lower alkanoylamido or N-(lower alkyl)-N-(lower alkanoyl)-amido with a mineral acid.

2. The process of claim 1 wherein the acid used is concentrated hydrochloric acid.

3. The process of claim 1 wherein a compound of formula I so obtained wherein $R_5$ is an amino group is then N-acylated by reacting said compound with an acid halide or acid anhydride.

4. The process of claim 3 wherein the acid halide used is a lower alkanoic acid halide.

5. The process of claim 3 wherein rac. 4'-{3-[4-(p-fluoro-phenyl)-3,6-dihydro-1(2H)-pyridyl]-2-hydroxypropyoxy}-isobutyranilide is prepared.

6. A process according to claim 1, wherein a compound of formula II in which $R_2$ represents a hydrogen atom, Y' represents a hydroxymethylene group and $R_4$ represents a lower alkanoylamido group is used as the starting material.

7. A process according to claim 6, wherein a compound of formula II in which $R_3$ is present in the para-position of the phenyl ring, $R_4$ is present in the para-position of the phenyl ring and X represents an oxygen atom is used as the starting material.

8. A process according to claim 7, wherein rac. 4'-[3-[6-(p-fluoro-phenyl)-dihydro-6-methyl-2H-1,3-oxazin-3(4H)-yl]-2-hydroxy-propoxy]-acetanilide hydrochloride is used as the starting material.

9. A process according to claim 7, wherein 4'-[3-[6-(p-fluoro-phenyl)-dihydro-6-methyl-2H-1,3-oxazin-3(4H)-yl]-propoxy]-acetanilide is used as the starting material.

* * * * *